United States Patent [19]
Ichigi et al.

[11] Patent Number: 5,197,109
[45] Date of Patent: Mar. 23, 1993

[54] METHOD OF MANUFACTURING ASSEMBLY OF OPTICAL WAVEGUIDE SUBSTRATE AND OPTICAL FIBER ALIGNING SUBSTRATE

[75] Inventors: Takenori Ichigi; Akira Hamajima, both of Nagoya; Tetsuhisa Abe, Kawana; Atsuo Kondo, Nagoya, all of Japan

[73] Assignee: NGK Insulators, Ltd., Japan

[21] Appl. No.: 865,973

[22] Filed: Apr. 9, 1992

[30] Foreign Application Priority Data

Apr. 15, 1991 [JP] Japan .................................. 3-108310

[51] Int. Cl.$^5$ ............................ G02B 6/00; G02B 6/32
[52] U.S. Cl. ....................................................... 385/50
[58] Field of Search ................................. 385/50, 51, 52

[56] References Cited

U.S. PATENT DOCUMENTS

| | | | |
|---|---|---|---|
| 3,936,144 | 2/1976 | Caton | 385/50 X |
| 4,690,489 | 9/1987 | Neyer | 385/50 |
| 4,759,595 | 7/1988 | Boord et al. | 385/50 X |
| 4,772,085 | 9/1988 | Moore et al. | 385/50 X |
| 5,069,518 | 12/1991 | Sasaki | 385/50 X |
| 5,108,200 | 4/1992 | Nonaka et al. | 385/50 X |

FOREIGN PATENT DOCUMENTS

2-125209  5/1990  Japan .

*Primary Examiner*—Akm E. Ullah
*Attorney, Agent, or Firm*—Parkhurst, Wendel & Rossi

[57] ABSTRACT

In a method of forming an assembly of an optical waveguide substrate and an optical fiber aligning substrate by adjoining an end face of a main body of the optical waveguide substrate and an end face of a main body of the optical fiber aligning substrate, a starting block formed by a flat rectangular plate is divided along a dividing surface which intersects perpendicularly to a side wall as well as a bottom wall of the starting block which are selected as a reference surface to obtain the main bodies of the optical waveguide substrate and optical fiber aligning substrate, optical waveguides are formed on the main body of the optical waveguide substrate by using the side wall and bottom wall as a positional reference, V-shaped guide grooves are formed in the main body of the optical fiber aligning substrate by using the side wall and bottom wall as a positional reference, and optical fibers are inserted into the guide grooves.

18 Claims, 8 Drawing Sheets

FIG._1A
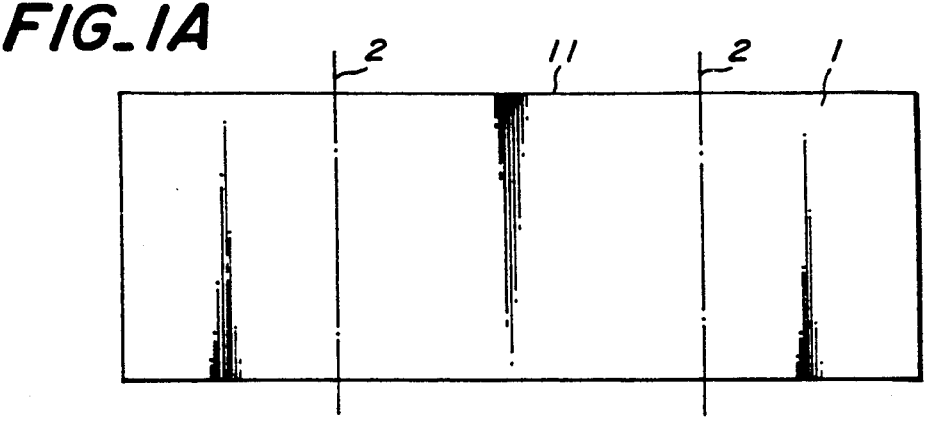
FIG._1B
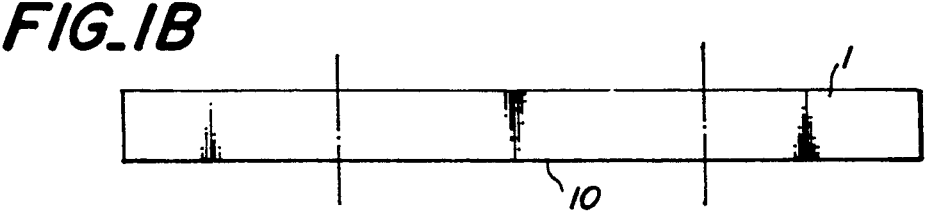
FIG._2A
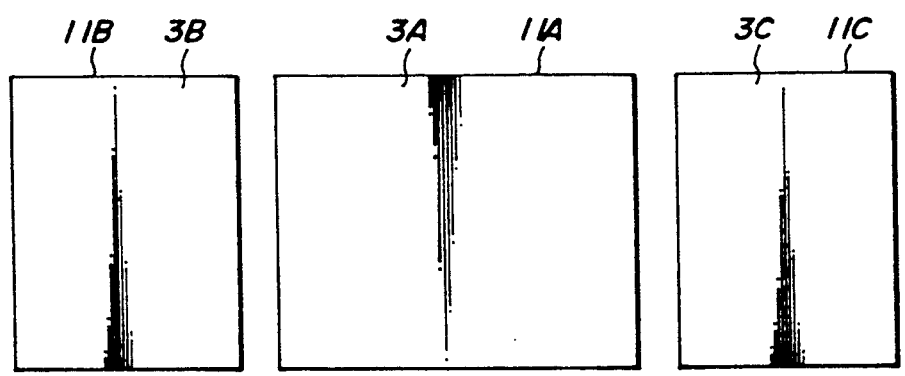
FIG._2B
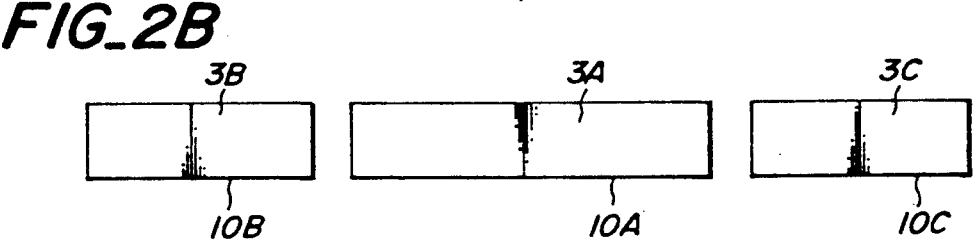

FIG_3
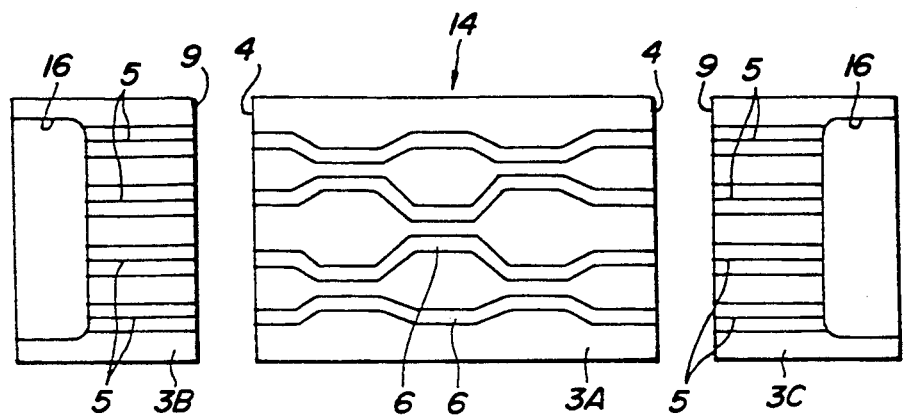
FIG_4
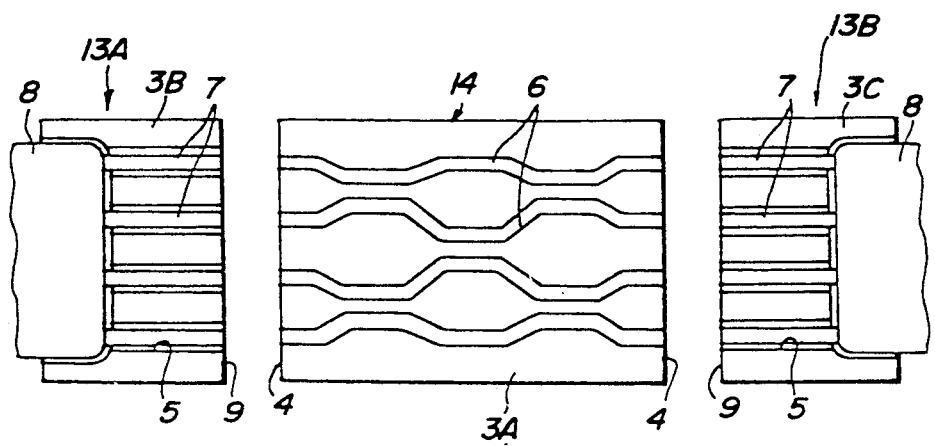

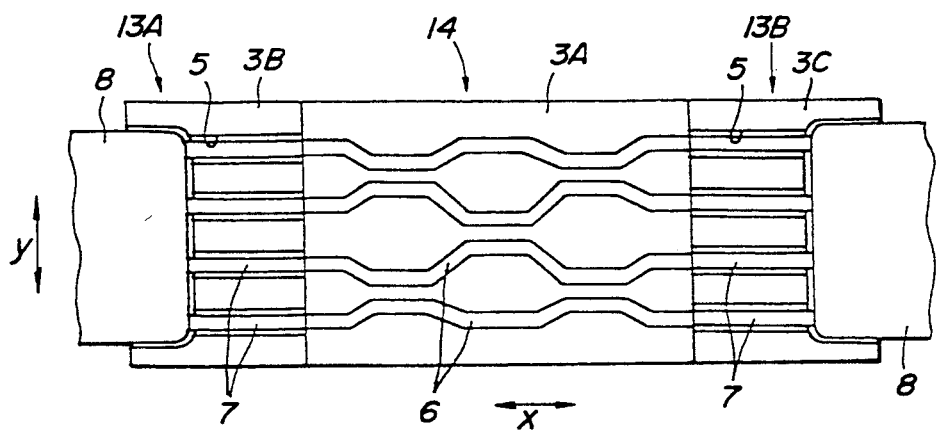
FIG_5
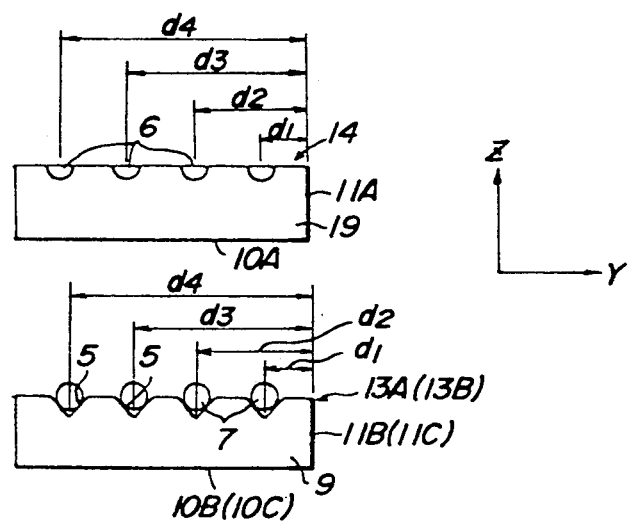
FIG_6

FIG_7
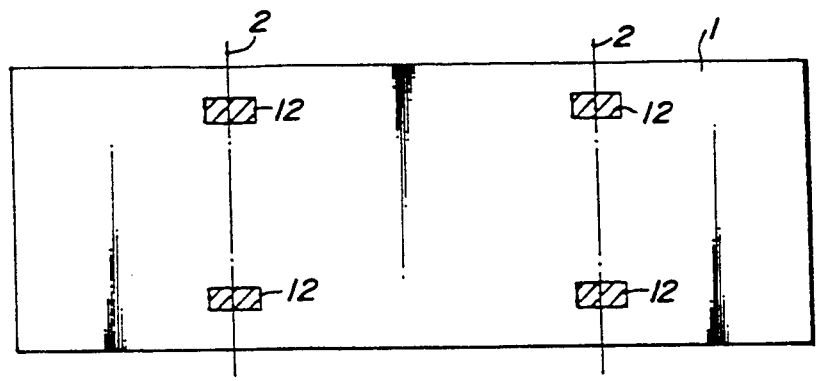
FIG_8
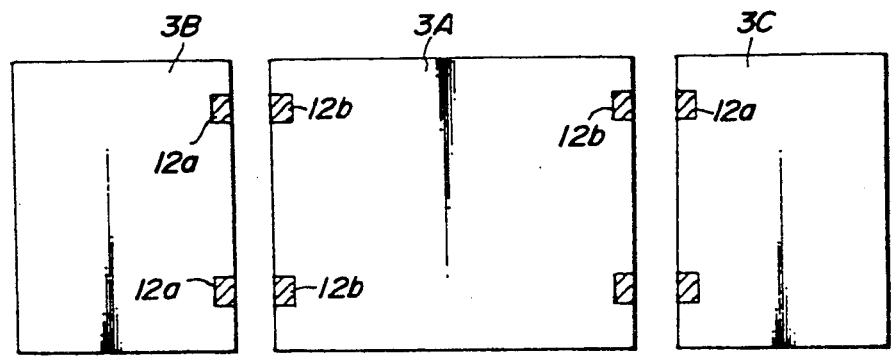

FIG_9
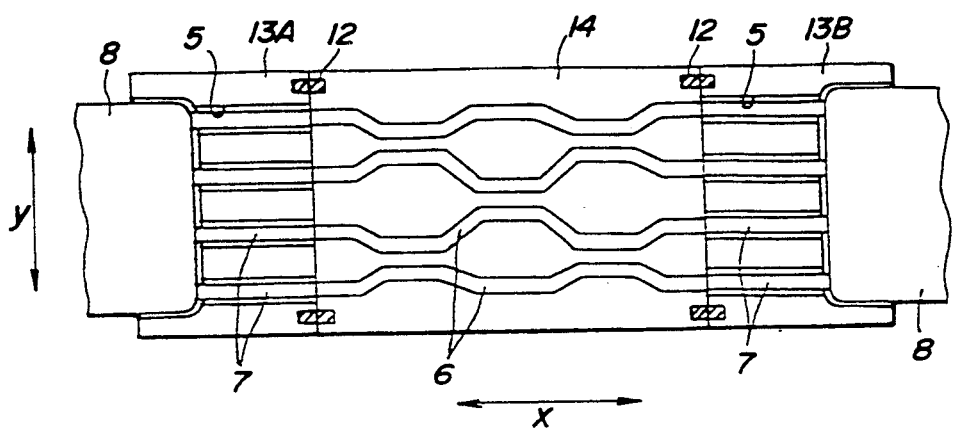
FIG_10
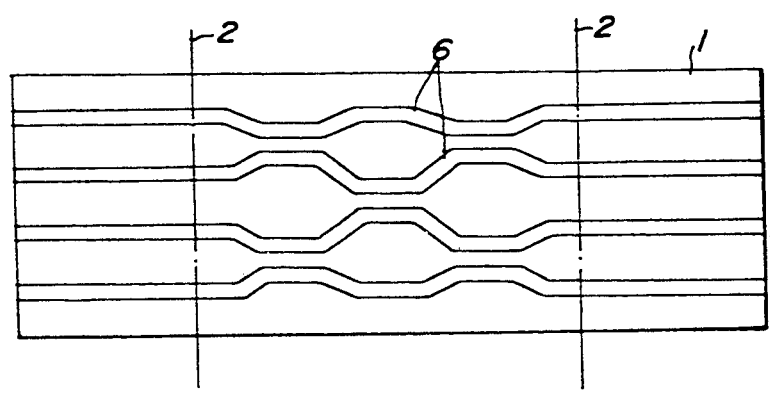

FIG_11
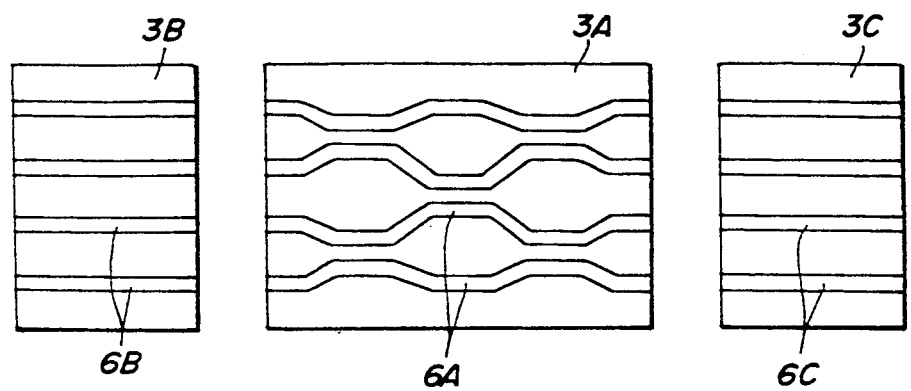
FIG_12
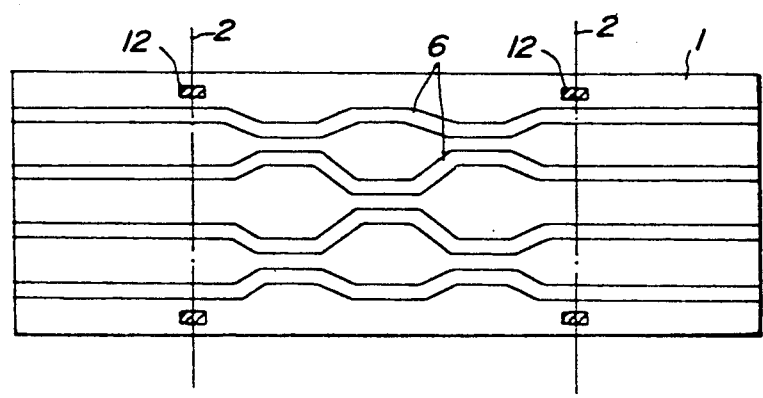

FIG_13
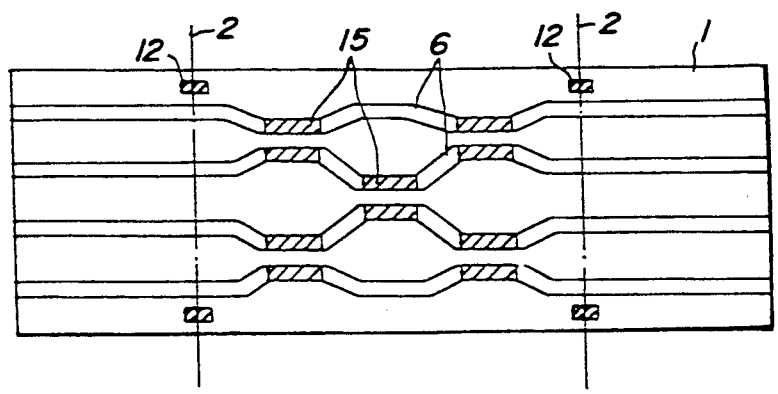
FIG_14
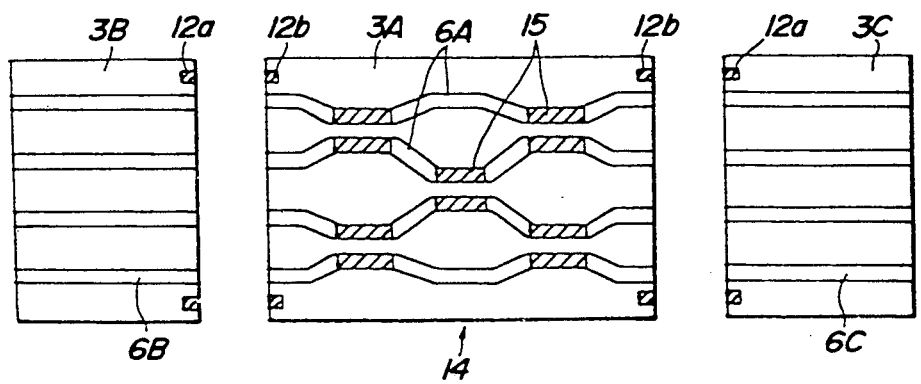

FIG_15
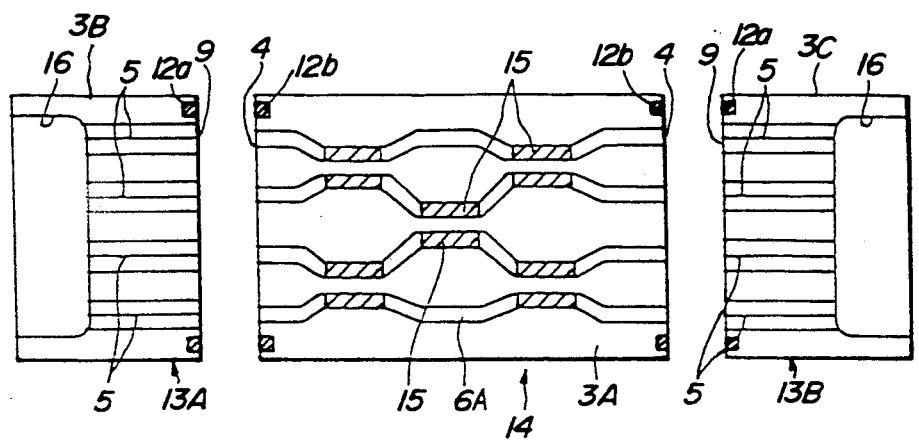
FIG_16
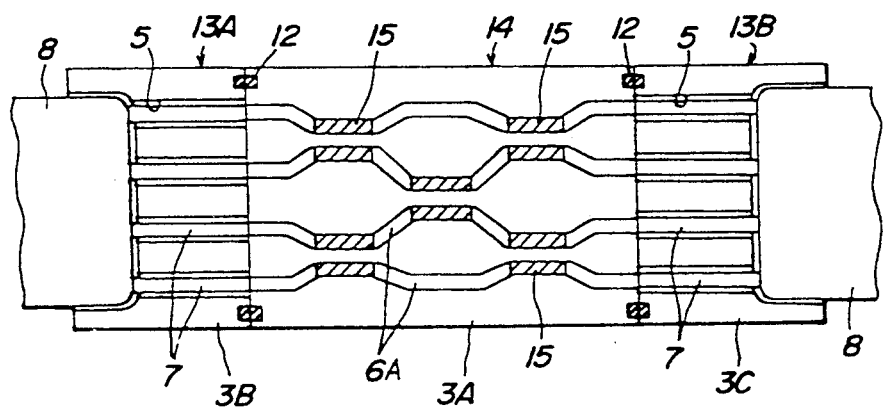

METHOD OF MANUFACTURING ASSEMBLY OF OPTICAL WAVEGUIDE SUBSTRATE AND OPTICAL FIBER ALIGNING SUBSTRATE

BACKGROUND OF THE INVENTION

1. Field of the Invention

The present invention relates to a method of manufacturing an assembly of an optical waveguide substrate comprising a main body and at least one optical waveguide formed in or on the main body and at least one optical fiber aligning substrate including a main body and at least one optical fiber held on the main body.

2. Description of the Related Art Statement

Recently there has been proposed a technique for forming an optical waveguide substrate by inwardly diffusing titanium into a main body made of a monocrystal of lithium niobate (LiNbO$_3$). Such an optical waveguide substrate may be utilized as a substrate for a waveguide type light modulator, a waveguide type branch and couple circuit and a waveguide type multiplexer and demultiplexer circuit. In the above mentioned optical waveguide substrate, it is necessary to couple an end face of an optical fiber with an end face of the light waveguide so that the light can be transmitted there-through at a high efficiency. That is to say, when there is formed a space between these end faces of these elements or the optical axes of these end faces are not aligned with each other, there might be produced a large loss in the light transmission, and thus these end faces have to be coupled with each other at a high precision.

There have been proposed various methods of coupling the end faces of these optical elements. In almost all methods, a laser light beam is actually transmitted between these optical elements and the adjustment is performed such that an amount of transmitted laser light becomes maximum. However, this requires a very long time and the working efficiency is low, so that the production efficiency becomes also low.

In Japanese Patent Application Laid-open Publication Kokai Hei 2-125209, there is disclosed a known method which could mitigate the above explained drawbacks. In this known method, guide grooves are formed in one surface of the optical waveguide substrate and guide pins are provided on a connector for supporting the optical fibers, and when the optical fiber aligning substrate is coupled with the optical waveguide substrate, the guide pins are inserted into the guide grooves. Then, the end face of the optical waveguide substrate is automatically aligned with the end face of the optical fiber aligning substrate.

In the above explained known method, upper and lower plates of the optical fiber holding connector are formed by silicon chips or plastic plates, so that it is very difficult to couple the end faces of the optical waveguides and the end faces of the optical fibers with each other precisely, and thus it is very difficult to obtain a high light coupling efficiency.

The inventors have tried to form the optical waveguides in the substrate and the optical fibers are inserted into V-shaped grooves formed in a surface of the optical fiber aligning substrate, and after end faces of these substrates have been precisely processed mechanically and polished optically, they are coupled with each other, while contours of the substrates are used as reference surfaces. However, this process has a limitation in the coupling precision between the end faces of the optical waveguide substrate and those of the optical fiber aligning substrate, and therefore a cumbersome adjustment of the optical axes is still required.

SUMMARY OF THE INVENTION

The present invention has for its object to provide a novel and useful method of manufacturing an assembly of an optical waveguide substrate and an optical fiber aligning substrate, in which the end faces of these substrates can be coupled with each other precisely, so that the very cumbersome adjustment of the optical axes can be dispensed with.

According to a first aspect of the invention, a method of manufacturing an assembly of an optical waveguide substrate and an optical fiber aligning substrate comprises the steps of:

preparing a starting block having a plurality of outer surfaces;

selecting at least one outer surface as a reference surface from said plurality of outer surfaces of the starting block;

dividing the starting block into a main body of optical waveguide substrate and at least one main body of optical fiber aligning substrate along at least one dividing surface which intersects with said reference surface, said main bodies having end faces which are formed by dividing the starting block;

forming at least one optical waveguide in said main body of the optical waveguide substrate, while a part of said reference surface which remains on the main body of the optical waveguide substrate is utilized as a positional reference;

forming at least one guide groove in a surface of the main body of the optical fiber aligning substrate, while a part of said reference surface which remains on the main body of the optical fiber aligning substrate is used as a positional reference;

inserting an optical fiber into said guide groove; and coupling said main body of the optical waveguide substrate and said main body of the optical fiber aligning substrate with each other by adjoining said end faces of said main bodies such that said reference surface is reconstructed.

According to a second aspect of the invention, a method of manufacturing an assembly of an optical waveguide substrate and an optical fiber aligning substrate comprises the steps of:

preparing a starting block having a plurality of outer surfaces;

selecting at least one outer surface as a reference surface from said plurality of outer surfaces of a starting substrate material;

forming at least one optical waveguide or optical waveguide forming pattern on an outer surface of the starting block, while said reference surface is used as a positional reference;

dividing the starting block into a main body of optical waveguide substrate and at least one main body of optical fiber aligning substrate along at least one dividing surface which intersects with said reference surface, said main bodies having end faces which are formed by dividing the starting block;

forming at least one guide groove along said optical waveguide or optical waveguide forming pattern formed on the main body of the optical fiber aligning substrate;

inserting an optical fiber into said guide groove; and coupling said main body of the optical waveguide substrate and said main body of the optical fiber aligning substrate with each other by adjoining said end faces of said main bodies such that said reference surface is reconstructed.

In this method, the guide groove can be formed by using the optical waveguide as the positional reference, so that the formation of the guide groove can be carried out very precisely.

BRIEF DESCRIPTION OF THE DRAWINGS

FIGS. 1A and 1B are plan view and side view showing a starting block used in a first embodiment of the method according to the invention;

FIGS. 2A and 2B are plan view and side view illustrating a step of dividing the starting block into an optical waveguide main body and two optical fiber aligning main bodies;

FIG. 3 is a plan view of the main bodies in which the optical waveguides and V-shaped grooves are formed;

FIG. 4 is a plan view of the main bodies in which the optical fibers are inserted into the V-shaped grooves;

FIG. 5 is a plan view depicting an assembly of the optical waveguide substrate and the optical fiber aligning substrate;

FIG. 6 is a side view illustrating end faces of the optical waveguide substrate and the optical fiber aligning substrate;

FIG. 7 is a plan view showing a starting block which is used in a second embodiment of the method according to the invention;

FIG. 8 is a plan view depicting a condition in which the starting block is cut into the main bodies of the optical waveguide substrate and optical fiber aligning substrate;

FIG. 9 is a plan view illustrating an assembly of the optical waveguide substrate and the optical fiber aligning substrate;

FIG. 10 is a plan view of a starting block in which optical waveguides are formed;

FIG. 11 is a plan view representing a condition in which the starting block is divided into main bodies of the optical waveguide substrate and optical fiber aligning substrate;

FIG. 12 is a plan view of a starting block in which alignment marks and optical waveguides are formed;

FIG. 13 is a plan view of the starting block in which electrode films are formed on portions of the optical waveguides;

FIG. 14 is a plan view depicting a condition in which the starting block is divided into main bodies of the optical waveguide substrate and optical fiber aligning substrates;

FIG. 15 is a plan view of the main bodies of the optical fiber aligning substrate in which V-shaped grooves are formed; and FIG. 16 is a plan view showing a condition in which the main bodies of the optical wave guide substrate and optical fiber aligning substrate are coupled with each other.

EXPLANATION OF THE PREFERRED EMBODIMENTS

FIGS. 1 to 6 show a first embodiment of the method according to the invention. In the following embodiments the present invention is applied to form an optical switching element of 4×4 columns, but it should be noted that the present invention may be equally applied to other optical elements.

As shown in FIGS. 1A and 1B, a starting block 1 is prepared. This starting block 1 may be formed by a monocrystal of lithium niobate or lithium tantalate (LiTaO$_3$), and may be cut out from a mother material. According to the present invention, at least one of the outer surfaces is utilized as a reference surface. It should be noted that the reference surface is preferably formed by a flat surface. In the present embodiment, the starting block 1 is formed by a flat rectangular plate having six flat outer surfaces. The starting block 1 has a length of 50 mm, a width of 10 mm and a thickness of 1 mm.

Next, the starting block 1 is divided along dividing lines or surfaces 2 to form a main body 3A of the optical waveguide substrate and two main bodies 3B and 3C of the optical fiber aligning substrate as illustrated in FIGS. 2A and 2B. It should be noted that in the present embodiment, the division is performed such that the main bodies 3B and 3C situate on opposite sides of the main body 3A. The division may be carried out by, for instance a mechanical cutting by using a dicing machine. The main body 3A has a length of 30 mm and the main bodies 3B and 3C have a length of 10 mm.

Then, as depicted in FIG. 3, in a major surface of the main body 3A of the optical waveguide substrate there are formed four columns of optical waveguides 6. The optical waveguides 6 may be formed by one of the known methods such as the inward diffusion of titanium, outward diffusion of lithium and proton exchange method. It is considered that the inward diffusion of titanium would be most desirable. When the optical waveguides 6 are formed by the inward diffusion of titanium, a titanium pattern is formed on the major surface of the main body 3A by using well-known photolithographic techniques and then the main body is heated to diffuse titanium into the main body. In practice, during this diffusion, lithium is diffused from the main body 3A into the titanium pattern, so that the optical waveguides 6 are formed to be slightly protruded from the surface of the main body. A depth of the optical waveguide is about 0–5 $\mu$m measured from the surface of the main body. It should be noted that the number of columns and the configuration of the optical waveguides 6 may be suitably selected in accordance with a final product. In this manner, an optical waveguide substrate 14 is formed.

As shown in FIG. 3, on major surfaces of the main bodies 3B and 3C of the optical fiber aligning substrate there are formed four columns of V-shaped grooves 5 by a mechanical process. In the present embodiment, the V-shaped grooves 5 are formed such that an apex angle is about 70 degrees and a depth is about 109 $\mu$m. It should be noted that the number and positions of the V-shaped grooves 5 are selected in accordance with those of the optical waveguides 6 of the optical waveguide substrate 14. Further there are formed recesses 16 in communication with the V-shaped grooves 5.

Then, optical fibers 7 having a diameter of 125 $\mu$m are inserted into the V-shaped grooves 6 of the main bodies 3B and 3C of the optical fiber aligning substrate as shown in FIG. 4 to form optical fiber aligning substrates 13A and 13B. In this case, end portions of coating 8 of the optical fiber cable are inserted into the recesses 16. It should be noted that in the present embodiment, four optical fibers 7 are embedded in the same coating 8 in parallel with each other. A length of portions of the optical fibers 7 which are protruded from the coating 8 is about 5 mm. The optical fibers 7 are secured to the main bodies 3A and 3B by means of suitable adhesive agent such as UV cure adhesive agent.

Then, end faces 4 of the optical waveguide substrate 14 and end faces 9 of the optical fiber aligning substrates 13A and 13B are polished optically. It should be noted that the optical polishing does not change the conformity of these end faces 9 and 19 which are obtained by cutting the same and single starting block 1. That is to say, the optical polishing is carried out for removing a very thin layer whose physical property has been affected by the mechanical process for cutting the starting block, so that the geometrical conformity of the end faces is not lost by the optical polishing.

After that, the optical waveguide substrate 14 and optical fiber aligning substrates 13A, 13B are coupled with each other by adjoining the optically polished end faces 4 and 9 of these substrates as depicted in FIG. 5. This coupling may be performed by using one of known adhesive agents. In the present embodiment, these substrates 14 and 13A, 13B are coupled with each other by means of UV cure adhesive agent.

During the coupling, the optical waveguide substrate 14 and optical fiber aligning substrates 13A, 13B are aligned in mutually orthogonal three directions x, y and z. As shown in FIG. 5, the directions x and y are parallel to the plane of the drawing of FIG. 5 and the direction z is perpendicular to said plane. In the direction x, the alignment is carried out by coupling the substrates 14, 13A and 13B with each other without forming any space therebetween. The alignment in the directions y and z can be attained by utilizing the outer configuration of the substrates as will be explained hereinbelow. To this end, a suitable jig having L-shaped cross section may be utilized. In this case, the bottom walls of the substrates 14 and 13A, 13B are placed on an upper surface of a bottom portion of the jig and the side walls of the substrates are brought into contact with a surface of an upright portion of the jig.

Upon preparing the starting block 1 shown in FIGS. 1A and 1B, one of the side walls and a bottom wall are selected as a reference surface. When a side wall 11 illustrated in FIG. 1A is selected as the reference surface, after the starting block 1 has been divided into the three main bodies 3A, 3B and 3C, the optical waveguides 6 and V-shaped grooves 5 are formed by using a side wall 11A of the main body 3A of the optical waveguide substrate as well as side walls 11B and 11C of of the main bodies 3B and 3C of the optical fiber aligning substrate as the positional reference. It should be noted that these side walls 11A, 11B and 11C are originated from the same side wall 11 of the starting block 1, so that the optical waveguides and V-shaped grooves can be formed precisely relative to each other. As illustrated in FIG. 6, the optical waveguides 6 and V-shaped grooves 5 are formed such that distances d1, d2, d3, d4 between the reference surface 11A and center points of the optical waveguides 6 viewed in the direction y and distances d1, d2, d3, d4 between the reference surface 11B or 11C and center points of the V-shaped grooves 5 are set to predetermined values. When the optical waveguide substrate 14 and the optical fiber aligning substrates 13A and 13B are coupled with each other, the side wall 11A of the substrate 14 and the side walls 11B, 11C of the optical fiber aligning substrates 13A, 13B are aligned with each other to reconstruct the original side wall 11 of the starting block 1. That is to say, the substrates 14, 13A and 13B are coupled with each other such that the side wall 11A of the optical waveguide substrate 14 and side walls 11B, 11C of the optical fiber aligning substrates 13A, 13B are aligned with each other in the direction y. Then, end faces of the optical waveguides 6 which emerge in the end faces 4 of the substrate 14 and end faces of the optical fibers 7 which emerge in the end faces 9 of the substrates 13A, 13B are self-aligned in the direction y.

When the bottom surface 10 of the starting block 1 shown in FIG. 1B is used as the reference surface, a bottom surface 10A of the main body 3A of the optical waveguide substrate and bottom surfaces 10B, 10C of the main bodies 3B, 3C of the optical fiber aligning substrate serve as the reference surfaces as depicted in FIG. 2B after the starting block 1 has been divided into the three main bodies. Then, the optical waveguides 6 and V-shaped grooves 5 are formed by using the bottom surfaces 10A, 10B and 10C as the positional reference. Finally the optical waveguide substrate 14 and optical fiber aligning substrates 13A and 13B are coupled with each other while the bottom surfaces 10A, 10B and 10C are aligned with each other to reconstruct the original bottom surface 10 of the starting block 1. In this manner, the end faces of the optical waveguides 6 and end faces of the optical fibers 7 inserted into the V-shaped grooves 5 are aligned in the direction z. That is to say, a center point of each of the optical waveguides 6 is substantially coincided with a center point of each of the optical fibers 7 in the direction z.

According to the present invention, the substrates 13A, 13B and 14 are formed from the same and single starting block 1 and the coupling end faces 4 and 9 are obtained by dividing the starting block into the main bodies 3A, 3B and 3C. Therefore, the outer configurations of the substrates 13A, 13B and 14 and the coupling end faces 4 and 9 are completely identical with each other, so that these substrates can be coupled with each other at an extremely high precision and thus the above mentioned alignments in the directions x, y and z can be attained very accurately. In the method in which the optical waveguide substrate and optical fiber aligning substrates are formed from different starting blocks, the outer configurations and coupling end faces of the substrates deviate from each other, and therefore it is practically impossible to obtain a precise alignment.

As explained above, in the present embodiment, the optical fiber aligning substrates 13A and 13B can be accurately aligned with the optical waveguide substrate 14 in the directions x, y and z, and thus the end faces of the optical waveguides 6 can be precisely aligned with the end faces of the optical fibers 7 and there is no deviation in the optical axes of these optical elements. Particularly, since the coupling end faces 4 and 9 of the optical waveguide substrate 14 and optical fiber aligning substrates 13A, 13B are obtained by dividing the starting block 1, there is produced no space or gap between these end faces, and thus the end faces of the optical waveguides 6 can be coupled with the end faces of the optical fibers 7 without producing any space therebetween. Therefore, a loss of light due to the reflection by the end faces can be decreased to a great extent.

In this manner, according to the present invention, it is no longer necessary to perform the adjustment of the optical axes between the end faces of the optical waveguides and the end faces of the optical fibers in order to suppress the loss in the light transmission, so that the working efficiency and productivity can be improved largely.

When only one of the side wall 11 and bottom wall 10 of the starting block 1 is selected as the reference surface, it is preferable to select the side wall as the reference surface. In the present embodiment, the optical waveguides 6 are formed by the inward diffusion of titanium, it is rather difficult to increase the precision in the direction z. In such a case, it would be necessary to effect the optical axis adjustment in the direction z.

When the starting block 1 is made of LiNbO$_3$ having a refraction index which is greatly different from that of the optical fiber, it is preferable to incline the end faces 4 of the optical waveguide substrate 14 and end faces 9 of the optical fiber aligning substrates 13A, 13B by about 8 degrees with respect to a plane which is perpendicular to the side wall 11 in order to reduce the reflection between the end faces of the optical waveguides 6 and the end faces of the optical fibers 7. In the known method, the end faces of these substrates have to be processed precisely, but this process is very cumbersome and difficult. Further the the optical axes of the optical waveguides are liable to be inclined with respect to those of the optical fibers.

In the method according to the invention, since the coupling end faces 4 and 9 of the substrates 14 and 13A, 13B are obtained by cutting the same and single starting block, it is no longer necessary to carry out the above mentioned cumbersome and difficult process. Moreover, the inclination of the optical axes between the optical waveguides and the optical fibers could be avoided.

Now a second embodiment of the method according to the invention will be explained.

At first, a starting block 1 is prepared as shown in FIGS. 1A and 1B. Then, there are formed alignment marks 12 at such positions that these alignment marks cross the division lines 2 as illustrated in FIG. 7. A width of the alignment marks 12 is set to be slightly smaller than a width of the optical waveguides. In the present embodiment, there are formed four alignment marks, but the number of the alignment marks may be selected at will. Further the alignment marks 12 may be formed by a mechanical process or photolithography.

Next the starting block 1 is divided into the main bodies 3A, 3B and 3C as depicted in FIG. 8. During this division, the alignment marks 12 are also divided into alignment mark halves. That is to say, four alignment mark halves 12a are remained on the main body 3A of the optical waveguide substrate and two alignment mark halves 12a are remained on each of the two main bodies 3B and 3C of the optical fiber aligning substrate.

Then the same processes as those of the first embodiment illustrated in FIGS. 3 and 4 are conducted to obtain an assembly of the optical waveguide substrate 14 and the optical fiber aligning substrates 13A and 13B as shown in FIG. 9. In the present embodiment, the alignment in the directions x and z are effected in the same manner as that of the first embodiment, but the alignment in the direction y may be performed by using the alignment mark halves 12a and 12b. That is to say, the optical waveguides 6 are formed while the alignment mark halves 12b are used as the positional standard and the V-shaped grooves 5 are formed in the upper surfaces of the main bodies 3A and 3B while the alignment mark halves 12a are utilized as the positional reference. Then, the optical waveguide substrate 14 and optical fiber aligning substrates 13A, 13B are coupled with each other by using the side wall 11 as the positional reference in the direction y. In this manner, the alignment mark halves 12a and 12b are coupled with each other to reconstruct the original alignment marks 12. In the present embodiment, the alignment mark halves 12a and 12b are used as the positional reference for forming the optical waveguides 6 and V-shaped grooves 5, so that the alignment in the direction y can be performed further easily and positively.

Next a third embodiment of the method according to the invention will be explained. At first, a starting block 1 is prepared as illustrated in FIG. 1. Then, optical waveguides 6 are formed in an upper surface of the starting block 1 as shown in FIG. 10 by means of the photolithography technique and heating process. Then, the starting block 1 is divided along the division lines 2 into one main body 3A of the optical waveguide substrate and two main bodies 3B and 3C of the optical fiber aligning substrate as depicted in FIG. 11. In the present embodiment, on an upper surface of the main body 4A there are formed optical waveguides 6A, and at the same time on upper surfaces of the main bodies 3B and 3C of the optical fiber aligning substrate there are also formed optical waveguides 6B and 6C. Then, the upper surfaces of the main bodies 3B and 3C are processed to form V-shaped grooves for holding the optical fibers in position while the optical waveguides 6B and 6C are used as the positional reference. As stated above, the optical waveguides 6B and 6C are protruded from the surfaces of the main bodies 3B and 3C, so that the V-shaped grooves can be formed along the optical waveguides by detecting the protrusions on the surface. In this manner, it is possible to form the V-shaped grooves in precise alignment with the optical waveguides 6B and 6C. Next the optical fibers are inserted into the V-shaped grooves and are secured thereto by an adhesive agent to form the optical fiber aligning substrates. Then the optical fiber aligning substrates are coupled with the optical waveguide substrate in the same manner as that of the previous embodiment and the end faces of the optical waveguides 6A are connected to the end faces of the optical fibers.

In the present embodiment, the optical waveguides 6B and 6C are formed in the main bodies 3A and 3B of the optical fiber substrates and the V-shaped grooves are formed by using these optical waveguides as the positional reference, so that the V-shaped grooves can be formed very easily and precisely.

In the present embodiment, after the optical waveguides have been formed, the starting block is divided. However, according to the invention, it is also possible to divide the starting block after a pattern for forming the optical waveguides has been formed. This pattern for forming the optical waveguides may be a photoresist pattern for etching the titanium film or a titanium pattern which is formed by etching the titanium film through the photoresist pattern. In the main bodies 3A, 3B of the optical fiber aligning substrate, the V-shaped grooves may be formed along such a pattern for forming the optical waveguides, and in the main body 3A of the optical waveguide substrate, the optical waveguides are formed by effecting the heating treatment.

FIGS. 12 and 13 are plans views showing processes in a fourth embodiment of the method according to the invention. In the present embodiment, electrodes are provided on an upper surface of the optical waveguide substrate to construct the optical modulators. As illustrated in FIG. 12, in the upper surface of the starting block 1 there are formed optical waveguides 6 and four alignment marks 12 with the aid of photolithography. In this case, the four optical waveguides 6 are formed by using the alignment marks 12 as the positional reference.

Then, ten electrodes 15 are formed on predetermined portions of the optical waveguides 6 as depicted in FIG. 13. In this case, a mask for forming the electrodes 15 is positioned on the upper surface of the starting block 1 by using the alignment marks 12 as the positional reference so that the electrodes can be precisely positioned with respect to the optical waveguides 6. Next, as shown in FIG. 14, the starting block 1 is divided along cutting lines 2 to form the optical waveguide substrate 14 having optical waveguides 6A formed therein and main bodies 3B and 3C of the optical fiber aligning substrate. It should be noted that the alignment marks 12 are divided into alignment mark halves 12a and 12b.

Then, the upper surfaces of the main bodies 3B and 3C of the optical fiber aligning substrate are processed along the optical waveguides 6B and 6C to form V-shaped grooves 5 as shown in FIG. 15, while the alignment mark halves 12a are used as the positional reference. After the optical fibers 7 are inserted into the V-shaped grooves 5, the optical fiber aligning substrates 13A and 13B are coupled with the optical waveguide substrate 14 in the same manner as that explained in the previous embodiments to form an assembly of the optical waveguide substrate 14 and optical fiber aligning substrates 13A, 13B as depicted in FIG. 16. Also in the present embodiment, the advantages which could be obtained in the previous embodiments can be attained, and further since the optical waveguides 6A and the electrodes 15 are provided by using the alignment marks 12, the alignment of the optical waveguides and the electrodes can be performed precisely and easily.

The present invention is not limited to the embodiments explained hereinbefore and many modifications and alternations may be conceived by those skilled in the art within the scope of the invention. For instance, in the second embodiment, the alignment marks 12 and optical waveguides 6 may be formed simultaneously by photolithography as shown in FIG. 12. In the above embodiments, the optical waveguides are formed by the inward diffusion of titanium, but the present invention may be equally applied to a so-called glass optical waveguide (ion exchange glass optical waveguide, ion implanted optical waveguide). Further in the above embodiments, the optical waveguides are formed in the surface of the main body, but according to the invention it is also possible to deposit an active layer on the main body by sputtering or epitaxial growth and the optical wave-guides may be formed in this active layer. In such a case, the side wall of the starting block may be advantageously used as the positional reference. Then the adjustment of the optical axis in the direction z has to be carried out. Moreover, a protection cover plate may be provided on the optical fiber aligning substrate such that the optical fibers are clamped between the protection cover plate and the substrate.

As explained above in detail, in the method according to the present invention, the optical waveguide substrate and optical fiber aligning substrates are formed from the same and single starting block and further these substrates are coupled with each other at the end faces which are obtained by dividing the starting block such that the original outer configuration of the starting block is reconstructed. Therefore, the optical waveguide substrate and optical fiber aligning substrates can be assembled in an easy and precise manner, so that the end faces of the optical waveguides and optical fibers can be aligned with each other very accurately without introducing the undesired inclination of the optical axes. Therefore, the loss of the light transmission due to the reflection and leakage of light at the coupling end faces can be reduced to a great extent. In this manner, the working efficiency and productivity of the assembly of the optical waveguide substrate and optical fiber aligning substrates can be improved.

What is claimed is:

1. A method of manufacturing an assembly of at least one optical waveguide substrate and at least one optical fiber aligning substrate comprising the steps of:
   preparing a starting block having a plurality of outer surfaces;
   selecting at least one outer surface as a reference surface from said plurality of outer surfaces of the starting block;
   dividing the starting block into a main body of optical waveguide substrate and at least one main body of optical fiber aligning substrate along at least one dividing surface which intersects with said reference surface, said main bodies having end faces which are formed by dividing the starting block;
   forming at least one optical waveguide in said main body of the optical waveguide substrate, while a part of said reference surface which remains on the main body of the optical waveguide substrate is utilized as a positional reference;
   forming at least one guide groove in a surface of the main body of the optical fiber aligning substrate, while a part of said reference surface which remains on the main body of the optical fiber aligning substrate is used as a positional reference;
   inserting an optical fiber into said guide groove; and
   coupling said main body of the optical waveguide substrate and said main body of the optical fiber aligning substrate with each other by adjoining said end faces of said main bodies such that said reference surface is reconstructed.

2. A method according to claim 1, wherein said starting block has at least one flat outer surface, and said at least one flat outer surface is selected as the reference surface.

3. A method according to claim 2, wherein said starting block is formed by a flat rectangular plate having three pairs of parallel outer surfaces which are mutually orthogonal, and one side wall which extends perpendicularly to said dividing surface is selected as the reference surface.

4. A method according to claim 3, wherein a bottom wall of said flat rectangular plate is selected as the reference surface in addition to said one side wall.

5. A method according to claim 3, wherein said block is divided into one main body of the optical waveguide substrate and two main bodies of the optical fiber aligning substrate, said two main bodies of the optical fiber aligning substrate being positioned on opposite sides of the main body of the optical waveguide substrate.

6. A method according to claim 1, wherein prior to dividing the starting block, a plurality of alignment marks having a width which is smaller than a width of an optical waveguide are formed on the surface of the starting block such that the alignment marks cross said dividing surface, dividing the starting block such that each of the alignment marks are divided into alignment mark halves, said optical waveguide is formed in said main body of the optical waveguide substrate by using the alignment mark halves on the main body of the optical waveguide substrate, and said guide grooves are formed in the surface of the main body of the optical fiber aligning substrate by using alignment mark halves on the main body of the optical fiber aligning substrate.

7. A method according to claim 6, wherein said end face of the optical waveguide substrate and said end face of the optical fiber aligning substrate are coupled with each other such that the alignment mark halves on the optical waveguide substrate and the alignment mark halves on the optical fiber aligning substrate are coupled with each other to reconstruct the original alignment marks on the starting block.

8. A method of manufacturing an assembly of at least one optical waveguide substrate and at least one optical fiber aligning substrate comprising the steps of:
preparing a starting block having a plurality of outer surfaces;
selecting at least one outer surface as a reference surface from said plurality of outer surfaces of a starting substrate material;
forming at least one optical waveguide or optical waveguide forming pattern on an outer surface of the starting block, while said reference surface is used as a positional reference;
dividing the starting block into a main body of optical waveguide substrate and at least one main body of optical fiber aligning substrate along at least one dividing surface which intersects with said reference surface, said main bodies having end faces which are formed by dividing the starting block;
forming at least one guide groove in a surface of said main body of the optical filter aligning substrate by using said optical waveguide or optical waveguide forming pattern formed on the main body of the optical fiber aligning substrate as a positional reference;
inserting an optical fiber into said guide groove; and
coupling said main body of the optical waveguide substrate and said main body of the optical fiber aligning substrate with each other by adjoining said end faces of said main bodies such that said reference surface is reconstructed.

9. A method according to claim 8, wherein said starting block has at least one flat outer surface, and said at least one flat outer surface is selected as the reference surface.

10. A method according to claim 9, wherein said starting block is formed by a flat rectangular plate having three pairs of parallel outer surfaces which are mutually orthogonal, and one side wall which extends perpendicularly to said dividing surface is selected as the reference surface.

11. A method according to claim 10, wherein a bottom wall of said flat rectangular plate is selected as the reference surface in addition to said one side wall.

12. A method according to claim 10, wherein said block is divided into one main body of the optical waveguide substrate and two main bodies of the optical fiber aligning substrate, said two main bodies of the optical fiber aligning substrate being positioned on opposite sides of the main body of the optical waveguide substrate.

13. A method according to claim 8, wherein prior to dividing the starting block, a plurality of alignment marks having a width which is smaller than a width of an optical waveguide are formed on the surface of the starting block such that the alignment marks cross said dividing surface said optical waveguides or pattern for forming the optical waveguides are formed by using the alignment marks, dividing the starting block such that each of the alignment marks are divided into alignment mark halves, and said grooves are formed in the surface of the main body of the optical fiber aligning substrate by using alignment mark halves on the main body of the optical fiber aligning substrate.

14. A method according to claim 13, wherein said end face of the optical waveguide substrate and said end face of the optical fiber aligning substrate are coupled with each other such that alignment mark halves on the optical waveguide substrate and the alignment mark halves on the optical fiber aligning substrate are coupled with each other to reconstruct the original alignment marks on the starting block.

15. A method according to claim 8, wherein said optical waveguide is formed by providing a titanium film on the starting block, selectively etching the titanium film by photolithography to form a titanium pattern and heating the main body of the optical waveguide substrate to diffuse titanium into the main body to form the optical waveguide.

16. A method according to claim 15, wherein said guide grooves are formed along a portion of the optical waveguides provided in the main body of the optical fiber aligning substrate.

17. A method according to claim 8, wherein said optical waveguide forming pattern is formed by providing a titanium film on the starting block and forming a photoresist pattern on the titanium film, said photoresist pattern being identical with the optical waveguide pattern to be formed.

18. A method according to claim 17, wherein said guide grooves are formed along a portion of the photoresist pattern which is provided in the main body of the optical fiber aligning substrate.

* * * * *